United States Patent
Liu et al.

(10) Patent No.: US 9,576,035 B2
(45) Date of Patent: Feb. 21, 2017

(54) METHOD AND APPARATUS FOR PROVIDING INTEGRATED SEARCH AND WEB BROWSING HISTORY

(75) Inventors: Huanglingzi Liu, Beijing (CN); Wenli Zhou, Hunan (CN); Ying Liu, Beijing (CN); Yongguang Guo, Beijing (CN); Yuan Feng, Beijing (CN)

(73) Assignee: Nokia Technologies Oy, Espoo (FI)

( * ) Notice: Subject to any disclaimer, the term of this patent is extended or adjusted under 35 U.S.C. 154(b) by 257 days.

(21) Appl. No.: 14/127,563

(22) PCT Filed: Jun. 29, 2011

(86) PCT No.: PCT/CN2011/076556
§ 371 (c)(1),
(2), (4) Date: Jan. 31, 2014

(87) PCT Pub. No.: WO2013/000129
PCT Pub. Date: Jan. 3, 2013

(65) Prior Publication Data
US 2014/0156648 A1 Jun. 5, 2014

(51) Int. Cl.
*G06F 17/30* (2006.01)
(52) U.S. Cl.
CPC ... *G06F 17/30554* (2013.01); *G06F 17/30867* (2013.01); *G06F 17/30876* (2013.01)
(58) Field of Classification Search
None
See application file for complete search history.

(56) References Cited

U.S. PATENT DOCUMENTS 7,174,513 B1 2/2007 Nickum
8,930,339 B2 * 1/2015 Song .................. G06F 17/30864
707/706

(Continued)

FOREIGN PATENT DOCUMENTS

| WO | WO-2006/011819 A1 | 2/2006 |
| WO | WO-2007/076528 A1 | 7/2007 |
| WO | WO-2008/086299 A2 | 7/2008 |

OTHER PUBLICATIONS

Extended European Search Report for corresponding European Application No. 11868502.3 dated Apr. 23, 2015, 4 pages.

(Continued)

*Primary Examiner* — William Spieler
(74) *Attorney, Agent, or Firm* — Alston & Bird LLP

(57) ABSTRACT

An apparatus, method, and computer program product are provided for creating and displaying an integrated search and web browser history to a user. In particular, the apparatus includes a processor and a memory including computer program code, and the memory and computer program code are configured to, with the processor, cause the apparatus to receive search data provided to a website and navigational data relating to a webpage. The apparatus may determine a relationship between the search data and the navigational data and may further provide for a graphical representation of the search data, the navigational data, and the relationship between the search and navigational data to be displayed to the user. Thus, the user can have not only a record of the webpages accessed or search terms used in the previous search, but also a meaningful organization and contextual representation of the search.

15 Claims, 10 Drawing Sheets

(56) References Cited

U.S. PATENT DOCUMENTS

| | | | |
|---|---|---|---|
| 2006/0031771 | A1 | 2/2006 | MacHeffner |
| 2006/0206460 | A1 | 9/2006 | Gadkari |
| 2007/0061336 | A1* | 3/2007 | Ramer .............. G06F 17/30749 |
| 2007/0244900 | A1 | 10/2007 | Hopkins et al. |
| 2009/0216724 | A1 | 8/2009 | Cai et al. |
| 2009/0328133 | A1* | 12/2009 | Strassner ............ H04L 41/0853 726/1 |
| 2010/0318558 | A1* | 12/2010 | Boothroyd ........ G06F 17/30731 707/769 |
| 2012/0072402 | A1* | 3/2012 | Fraboulet-Laudy ... G06N 5/003 707/705 |

OTHER PUBLICATIONS

Simko, J. et al., *Sematic History Map: Graphs Aiding Web Revisitation Support*, 2010 Workshops on Database and Expert Systems Applications (DEXA), IEEE (Aug. 2010) 206-210.

Vassileva, I. & J.; "*A Review of Organizational Structures of Personal Information Management*;" dated Mar. 2008; retrieved on Jan. 30, 2014 from <http://journals.tdl.org/jodi/article/download/251/200>.

International Preliminary Report for Application No. PCT/CN2011/076556; dated Jan. 7, 2014.

International Search Report and Written Opinion for Application No. PCT/CN2011/076556; dated Jan. 12, 2012.

"*Relationship extraction*;" Wikipedia; retrieved on Jan. 30, 2014 from <http://en.wikipedia.org/wiki/Relationship$_{13}$ extraction>.

"*Semantic similarity*;" Wikipedia; retrieved on Jan. 30, 2014 from <http://en.wikipedia.org/wiki/Semantic_similarity>.

"*Semantic Web*;" Wikipedia; retrieved on Jan. 30, 2014 from <http://en.wikipedia.org/wiki/Semantic_Web>.

"*SurfLogger—track your internet surfing history including the data submitted to* websites;" SurfLogger; retrieved on Jan. 30, 2014 from <http://www.browsertools.net/internet-surfing-logger/index.html>.

"*Web History*;" Google—Web History; retrieved on Jan. 30, 2014 from <https://history.google.com/history/>.

* cited by examiner

METHOD AND APPARATUS FOR PROVIDING INTEGRATED SEARCH AND WEB BROWSING HISTORY

TECHNOLOGICAL FIELD

Embodiments of the present invention relate generally to Internet searching and navigation. In particular, embodiments of the present invention relate to an apparatus and method for relating search data and navigational data and for providing an integrated graphical representation of the search and web browsing histories based on the data and the relationships between the search data and the navigational data.

BACKGROUND

In this age of information, the Internet has become an everyday resource for people. At home or at work, users turn to the Web for information on current events, entertainment, medical conditions, history, employment, and every other topic imaginable. With advances in technology, the Internet has become more and more accessible. Users can access a website from their personal computers, laptops, cellular phones, and other mobile devices.

Because of the volume of information available via the Web, a person looking for information may get side-tracked. For example, a user may access a webpage that appears interesting, but may not be central to the user's original query. As such, although the user may eventually find the information sought, the path the user took to get there may be convoluted and difficult to duplicate from memory.

BRIEF SUMMARY OF EXAMPLE EMBODIMENTS

Accordingly, embodiments of an apparatus, method, and computer program product are described that provide for an improved mechanism by which a user's web searching and navigation histories may be captured and represented to the user in an integrated format, thereby providing a context for the user's activities and allowing a user to review, not only the end point of the user's query, but also the context of the results obtained.

Embodiments of the apparatus comprise at least one processor and at least one memory including computer program code. The at least one memory and the computer program code may be configured to, with the processor, cause the apparatus to at least access search data provided to a website, access navigational data relating to a webpage, determine a relationship between the search data and the navigational data, and provide for a graphical representation of the search data, the navigational data, and the relationship therebetween. The relationship may comprise a semantic relationship, and/or the relationship may comprise a navigational relationship.

In some cases, the search data may include search data that is provided to a first website and search data that is provided to a second website, where the first website is different from the second website. The search data may include at least one keyword, and the website may include a search engine. Furthermore, the navigational data may comprise a web address, a hyperlink, and/or webpage content.

In some embodiments, the graphical representation of the search data may include an indication of a keyword, and the graphical representation of the navigational data may include an indication of a webpage. The memory and computer program code may be further configured to, with the processor, cause the apparatus to receive an input via the graphical representation selecting an indicated keyword or an indicated webpage. The selection of an indicated keyword may result in a new search, and the selection of an indicated webpage may take the user to the indicated webpage.

In other embodiments, a method and a computer program product are provided for providing an integrated search and navigation history. The method may include accessing search data provided to a website, accessing navigational data relating to a webpage, determining a relationship between the search data and the navigational data, and providing for a graphical representation of the search data, the navigational data, and the relationship therebetween. As noted above, the relationship may include a semantic relationship, and/or the relationship may include a navigational relationship.

In some embodiments, the search data may include search data provided to a first website and search data provided to a second website, where the first website is different from the second website. Furthermore, the search data may include at least one keyword, and the website may include a search engine. In addition, the navigational data may comprise a web address, a hyperlink, and/or website content.

In some embodiments, the graphical representation of the search data may comprise an indication of a keyword, and the graphical representation of the navigational data may comprise an indication of a webpage. The method may further include receiving an input via the graphical representation selecting an indicated keyword or an indicated webpage, wherein selection of an indicated keyword results in a new search and selection of an indicated webpage takes the user to the indicated webpage.

In still other embodiments, an apparatus is provided that includes means for accessing search data provided to a website, means for accessing navigational data relating to a webpage, means for determining a relationship between the search data and the navigational data, and means for providing for a graphical representation of the search data, the navigational data, and the relationship therebetween.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
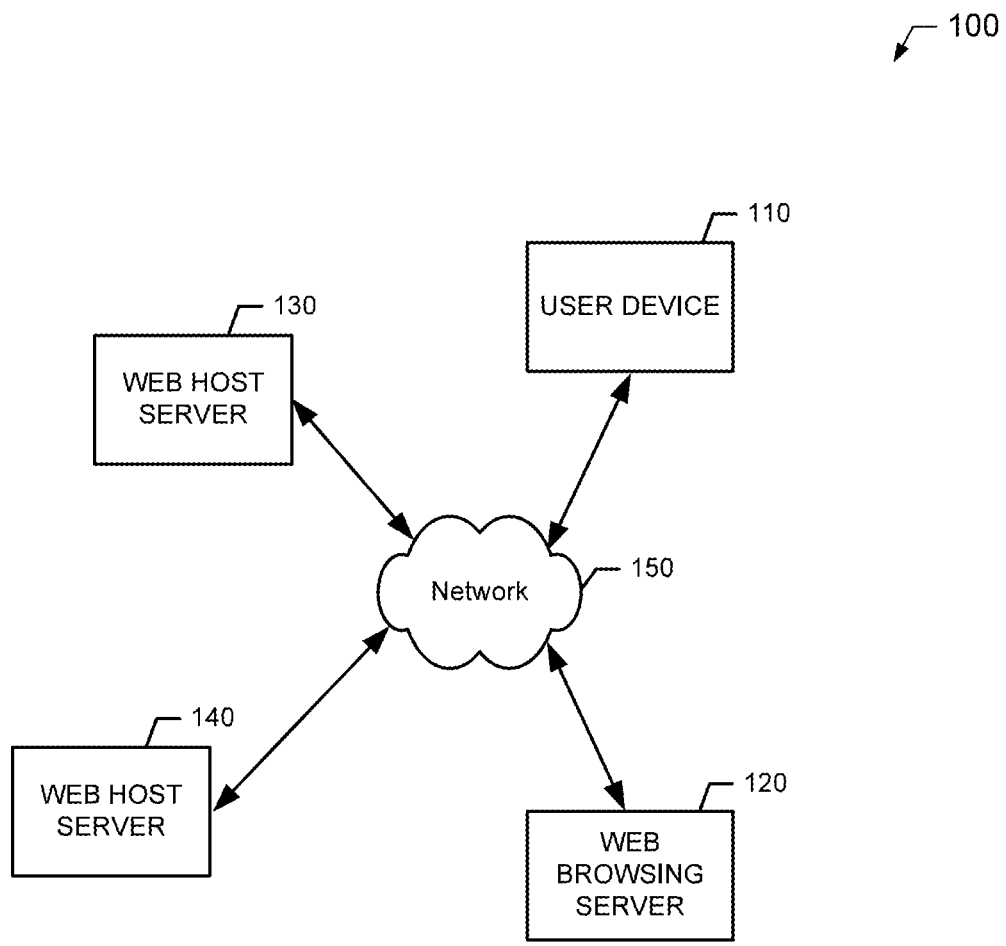
FIG. 1 illustrates a block diagram of a system for providing an integrated graphical representation of search and web browsing histories according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

The Internet and, more specifically, the World Wide Web, have become important resources for anyone looking for information about almost any topic. For example, search engines such as Google®, Yahoo!®, Bing, and numerous others are used for keyword searching to identify webpages relevant to the user's inquiry; websites are navigated using hyperlinks that lead to other pages within the website and/or to other target sites; and/or web addresses are input directly to a web browser to take the user to the identified webpage.

In the course of searching for information on a particular topic, the user may be led to a website or webpage that has limited information or does not have the information the user is seeking. In some cases, the user may be distracted from the original inquiry, for example, following a hyperlink to an interesting webpage that has nothing to do with search at hand. After perusing the interesting (yet off-topic) webpage, the user may go back to the previous search results and resume the search. Thus, although the user may eventually land on a webpage that provides the information sought, the path to get there may not always be linear.

It may be helpful in some cases for the user to review the search methodology to either seek supplemental information or review information that may have been skipped over during the process of the search. Certain tools currently exist for documenting a user's search history (e.g., using Google® Web History), which records and displays in chronological order the keywords searched over the course of a searching session. Similarly, many web browsers make a record of the websites the user has visited and allow the user to open a previously accessed website. In cases where the user enters search criteria into multiple search engines, search terms used in one search engine may not be accessible for review by the user when in another search engine or website. Similarly, the user may not be able to view a complete history of a search that includes both the user's keyword searching activities and the user's navigational searching activities (e.g., the webpages visited). Moreover, web browser histories and search histories are typically organized chronologically. Thus, in cases where the user's search and navigation follow a non-linear path (as is often the case), search histories may lack details regarding the context of the searching (e.g., why a particular webpage was accessed or how different keyword terms used in a search are related).

Accordingly, embodiments of the apparatus, method, and computer program product described below provide an integrated search and web browser history to the user that is aimed at putting the search data and navigational data into context using semantic relationships and/or navigational relationships. In other words, the search data, the navigational data, and the relationships therebetween may be organized in a meaningful way and provided to the user as a graphical representation that illustrates the contextual environment of the search. Thus, the user can quickly discern relationships between various search terms and accessed webpages, for example, and can re-visit certain websites, build upon a previous search, or share a search with another user in a meaningful way that provides information regarding where the user has been, why the user was there, and how the user got there.

FIG. 1 illustrates a block diagram of a system 100 for providing an integrated search and web browser history to a user according to an exemplary embodiment of the present invention. While FIG. 1 illustrates one example of a configuration of a system for relating search data and navigational data and providing a graphical representation, numerous other configurations may be used to implement embodiments of the present invention.

As used herein, "search data" is data that is used in a search of at least a portion of a device, such as a search of files saved locally on the device from which the search is initiated (e.g., the user's mobile terminal), e-mails saved locally or on another device (e.g., an e-mail server) in communication with the user's device, and/or files saved on other devices in communication with the user's device via a network, such as the World Wide Web. A user may, for example, provide keyword search terms to a website implementing searching programs, such as a search engine, and the website may return a list of search results or "hits." The hits may include web pages, images, documents, and other types of information and files. The website may be, for example, a stand-alone search engine that is configured to search all of the World Wide Web, or the website may have search functionality that is concentrated on the particular website and configured to search content on that website, only.

In contrast, rather than describing, e.g., terms used to return a list of hits, "navigational data" is data that describes a particular location in a network, such as the World Wide Web. Thus, navigational data relates to a webpage and may be, for example, a particular webpage address that would direct the user to a certain webpage. The navigational data may also be a hyperlink, which, when selected, would have the effect of taking the user from the source webpage (e.g., the webpage containing the hyperlink) to a target webpage (e.g., a webpage or a particular part of a webpage identified by the hyperlink and to which the hyperlink leads). Thus, navigational data may be represented by a web address of the target webpage, a hyperlink, content from the webpage, or the name of the target webpage, among other things. As used herein, the terms hyperlink and link are used synonymously.

Referring to FIG. 1, the system 100 may include a user device 110, a web browsing server 120, and one or more web host servers 130, 140 configured to communicate over a network 150. Each web host server 130, 140 may be a dedicated server (e.g., a computer) or space on a server that is configured to make a website or webpage accessible via the World Wide Web. The web host server 130, 140 may be maintained directly by the owner of a website in some cases, or may be leased by the owner and maintained by a third party, such as through a web hosting service. Thus, in some embodiments, the web host servers 130, 140 are separate servers, for example, each server having its own processor and memory, whereas in other cases the servers are co-located and may share a processor and/or memory. Regardless, webpages and files may be uploaded to the web host server 130, 140 via file transfer protocol (FTP) or a web interface and made available to users via common access to the network 150.

The user device 110 may be, for example, a mobile terminal 10 (shown in FIG. 2), and may consist of or include an apparatus 50 configured in accordance with embodiments of the present invention, as described below. Depending on the type of user device 110, in some cases the user device may be configured to access webpages and content residing on the web host servers 130, 140 directly via the network 150, such as when the user device 110 is a laptop computer, for example. In other cases, however, the user device 110 may have limited capabilities for accessing content on the World Wide Web. For example, the user device 110 may be a cellular telephone with limited functionality for accessing Web content (e.g., the user device itself may not be equipped to communicate with the web host servers 130, 140). In such cases, the user device 110 may instead communicate with a web browsing server 120 via the network 150, which in turn may communicate with the web host servers 130, 140 to retrieve content for the user device.

Figure 2:
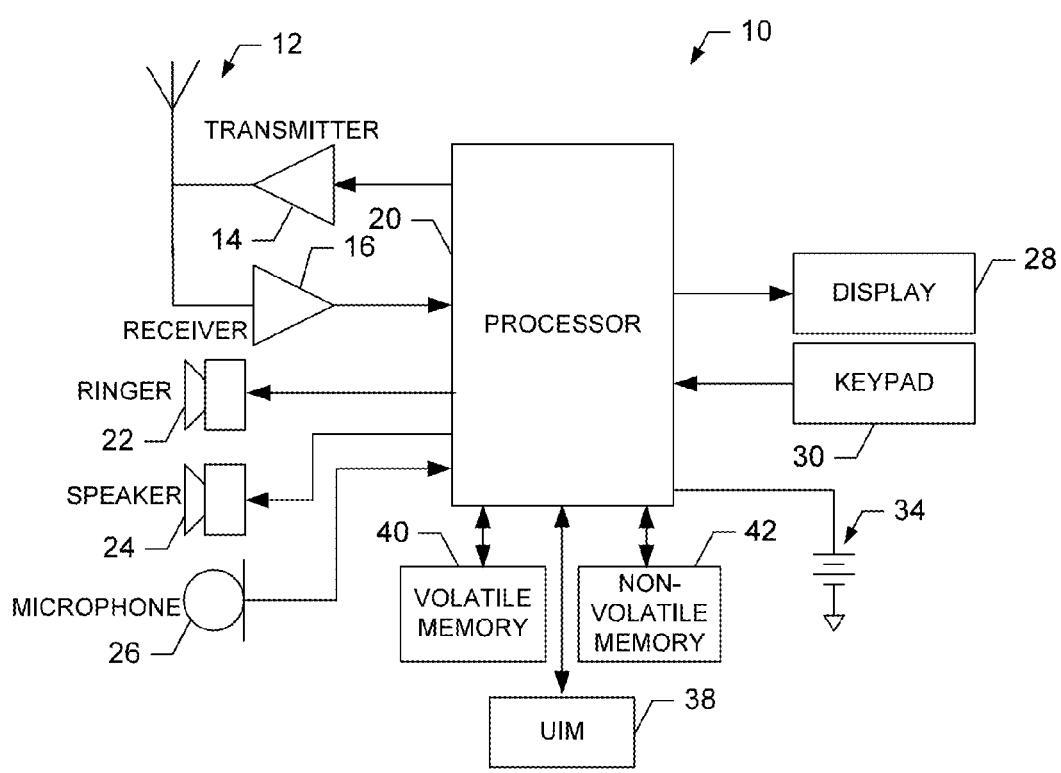
FIG. 2 illustrates a schematic block diagram of a mobile terminal according to an example embodiment of the present invention.

Turning now to FIG. 2, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 3), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 3, in which certain elements of an apparatus 50 for providing an integrated graphical representation of search and web browsing histories are depicted. The apparatus 50 of FIG. 3 may be employed, for example, in conjunction with the user device 110 of FIG. 1, such as with the mobile terminal 10 of FIG. 2. However, it should be noted that the apparatus 50 of FIG. 3 may also be employed in connection with a variety of other devices, both mobile and fixed, and therefore, embodiments of the present invention should not be limited to application on devices such as the mobile terminal 10 of FIG. 2. For example, the apparatus 50 may be employed on a personal computer or other user terminal. Moreover, in some cases, the apparatus 50 may be on a fixed device such as a server or other service platform and the content may be presented (e.g., via a server/client relationship) on a remote device such as a user terminal (e.g., the mobile terminal 10) based on processing that occurs at the fixed device.

Figure 3:
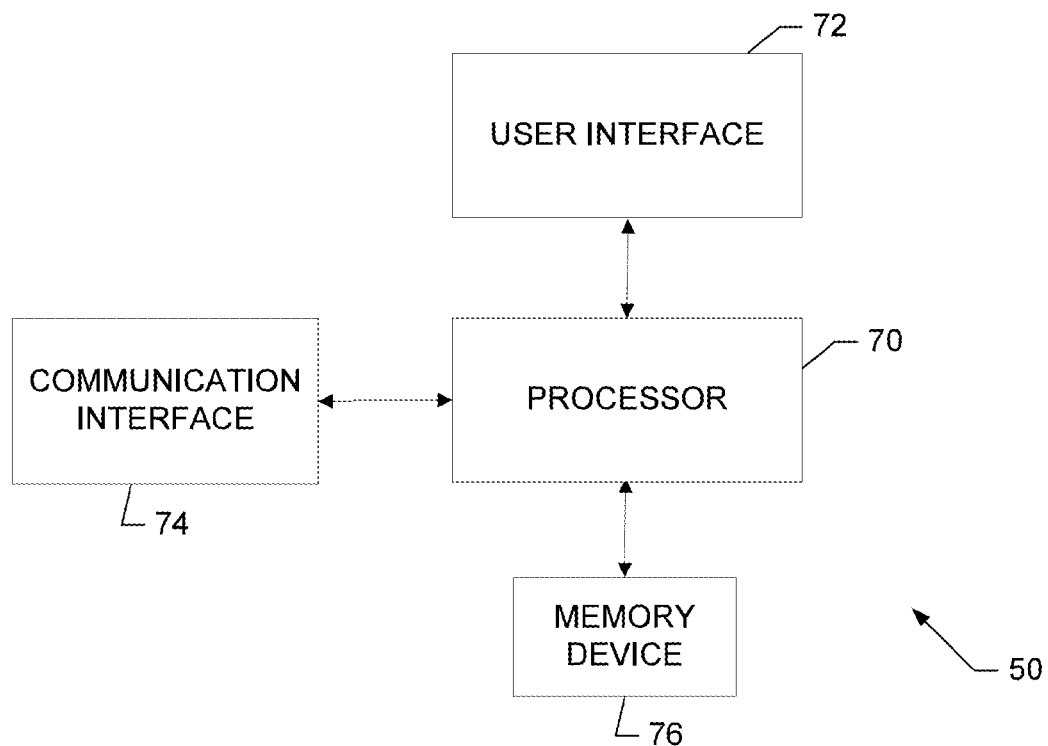
FIG. 3 illustrates a schematic block diagram of an apparatus for providing an integrated graphical representation of search and web browsing histories according to an example embodiment of the present invention.

It should also be noted that while FIG. 3 illustrates one example of a configuration of an apparatus for relating search data and navigational data, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 50 for providing an integrated graphical representation of search and web browsing histories may include or otherwise be in communication with a processor 70, a user interface 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input and/or to cause provision of an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

Figure 4:
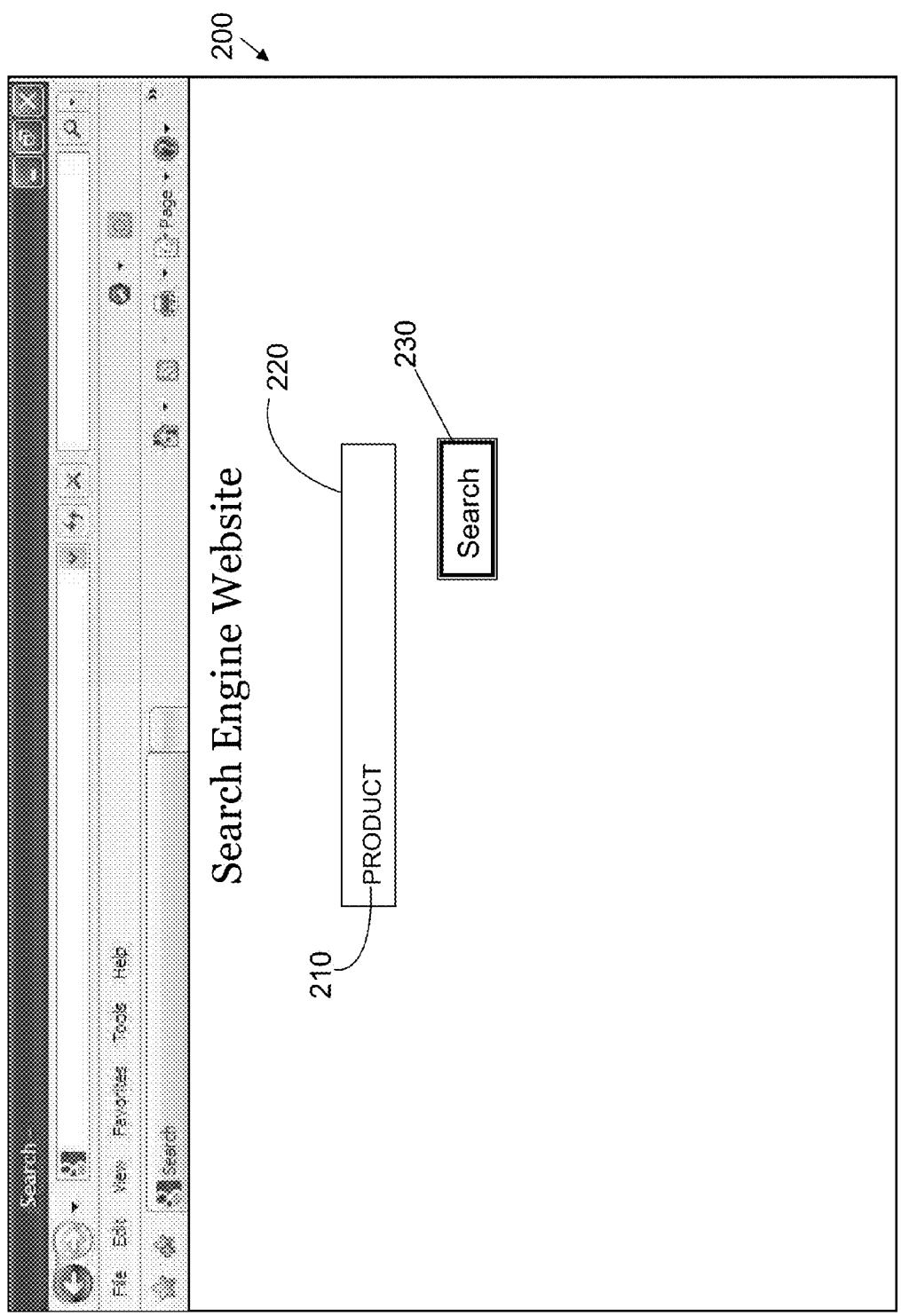
FIG. 4 illustrates a screen shot of a search engine website to which a search data is provided in accordance with an example embodiment of the present invention.

Turning now to FIG. 4, a user who wishes to find information on a network, such as the Web, may, in some cases, go to a website 200 with search capabilities, such as a search engine, and enter search data 210 into a text box 220. For example, if the user wants to buy a certain product, but is unsure which brand to purchase, the user's search data may be a keyword relating to the product (e.g., one or more terms that describe the product, shown generically in FIG. 4 as the keyword "Product"). For instance, if the user is looking to purchase a new table saw, the user may enter the keyword "Table Saw."

Figure 5:
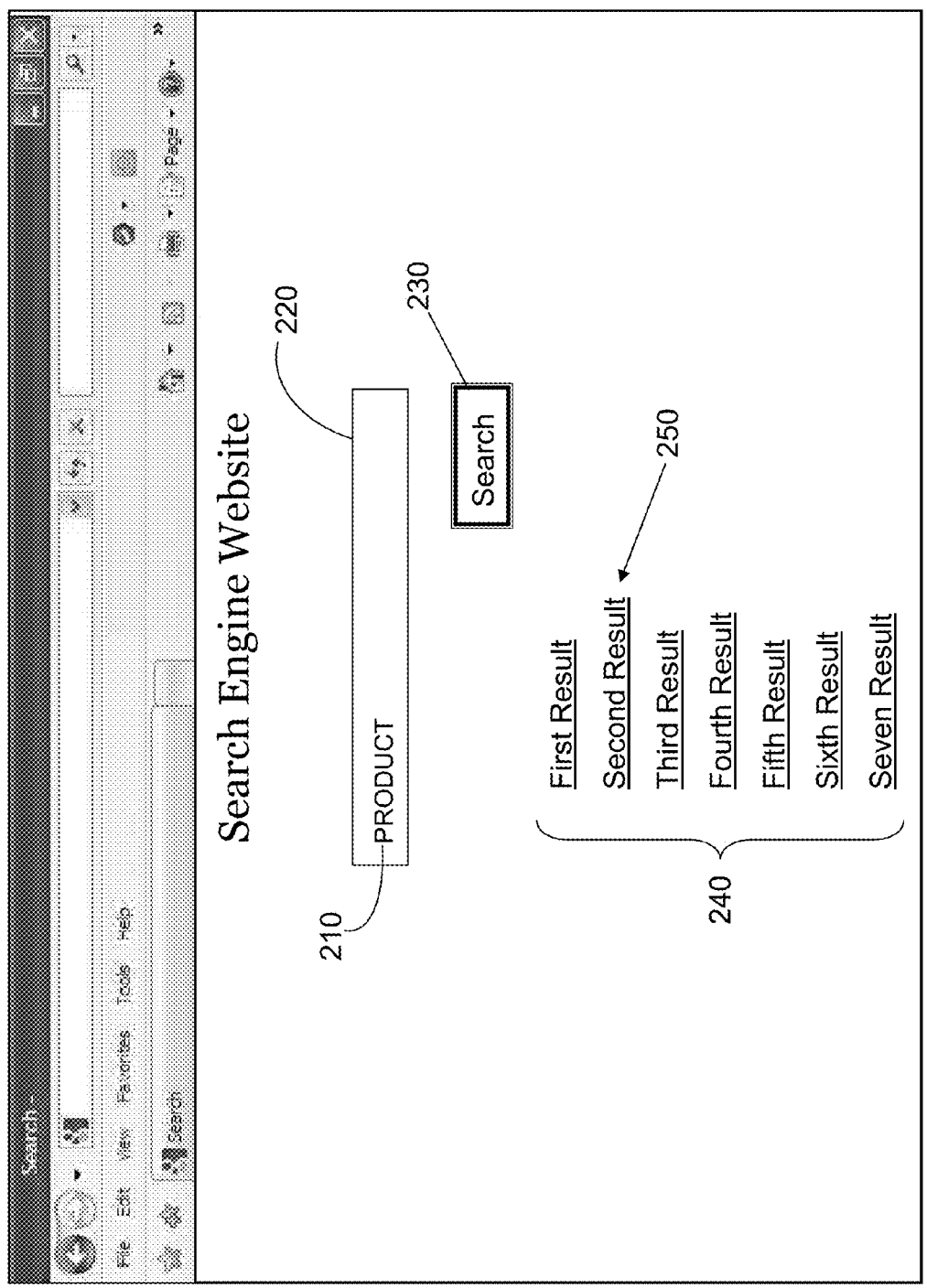
FIG. 5 illustrates a screen shot of a list of hits identified by the search engine of FIG. 4 based on the search data in accordance with an example embodiment of the present invention.

In the depicted example, the user may initiate a search based on the search data 210 by selecting the "Search" button 230. The search engine may then return a list of results for the particular search term. The results may reflect the most relevant websites, webpages, documents, images, or other content that could be found on the Web by the search engine based on the search data 210. The website (e.g., the search engine) may identify a list of hits that are relevant to the search data 210, for example, based on metatags, webpage indexing, and/or other search methods. In the example of FIG. 5, seven results 240 were provided by the search engine website for the search data 210.

Continuing this example, the user may, upon reading the list of results 240, wish to look at the Second Result in more detail. Accordingly, the user may click on a link 250 (e.g., represented by the underlined terms "Second Result" in FIG. 5) corresponding to the Second Result, which would direct the user to the website 260 for the Second Result, shown in FIG. 6.

In some cases, the user may know that the Second Result Website contains information worth looking at without necessarily performing a search for the Product. For example, the user may have heard of a particular brand of the Product and may want to visit the brand's website. In this case, rather than click on the link 250 shown in FIG. 5, the user may directly enter the brand website's web address into the text box 270 provided in the header 280, shown in FIG. 6. In the depicted example, the user would type "www.webaddress.com," which would take the user to the Second Result Website shown. Thus, the navigational data may be the hyperlink 250 for the Second Result selected by the user, shown in FIG. 5, the text input of the web address "www.webaddress.com" in the text box 270, or at least part of the content of the target webpage. Regardless, once the user is viewing a webpage, such as the webpage 265 from the Second Result Website 260 shown in FIG. 6, the user may click on another hyperlink 290 (e.g., "What people think about this product"), which would lead the user to another webpage 267 (shown in FIG. 7), which may be part of the same Second Result Website or a different website.

Figure 6:
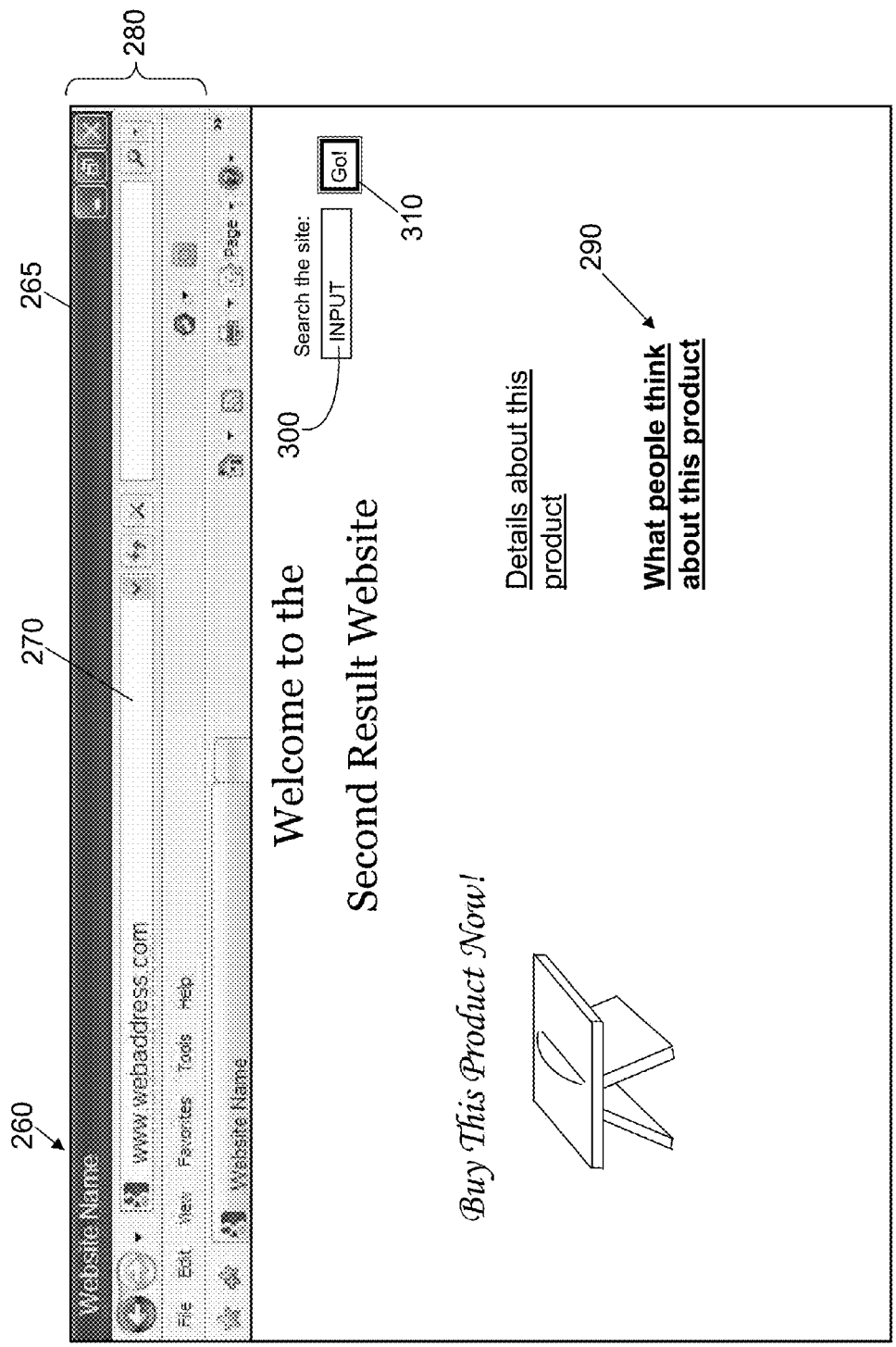
FIG. 6 illustrates a target webpage including a hyperlink based on the selection of one of the hits listed in the screen shot of FIG. 5 in accordance with an example embodiment of the present invention.
Figure 7:
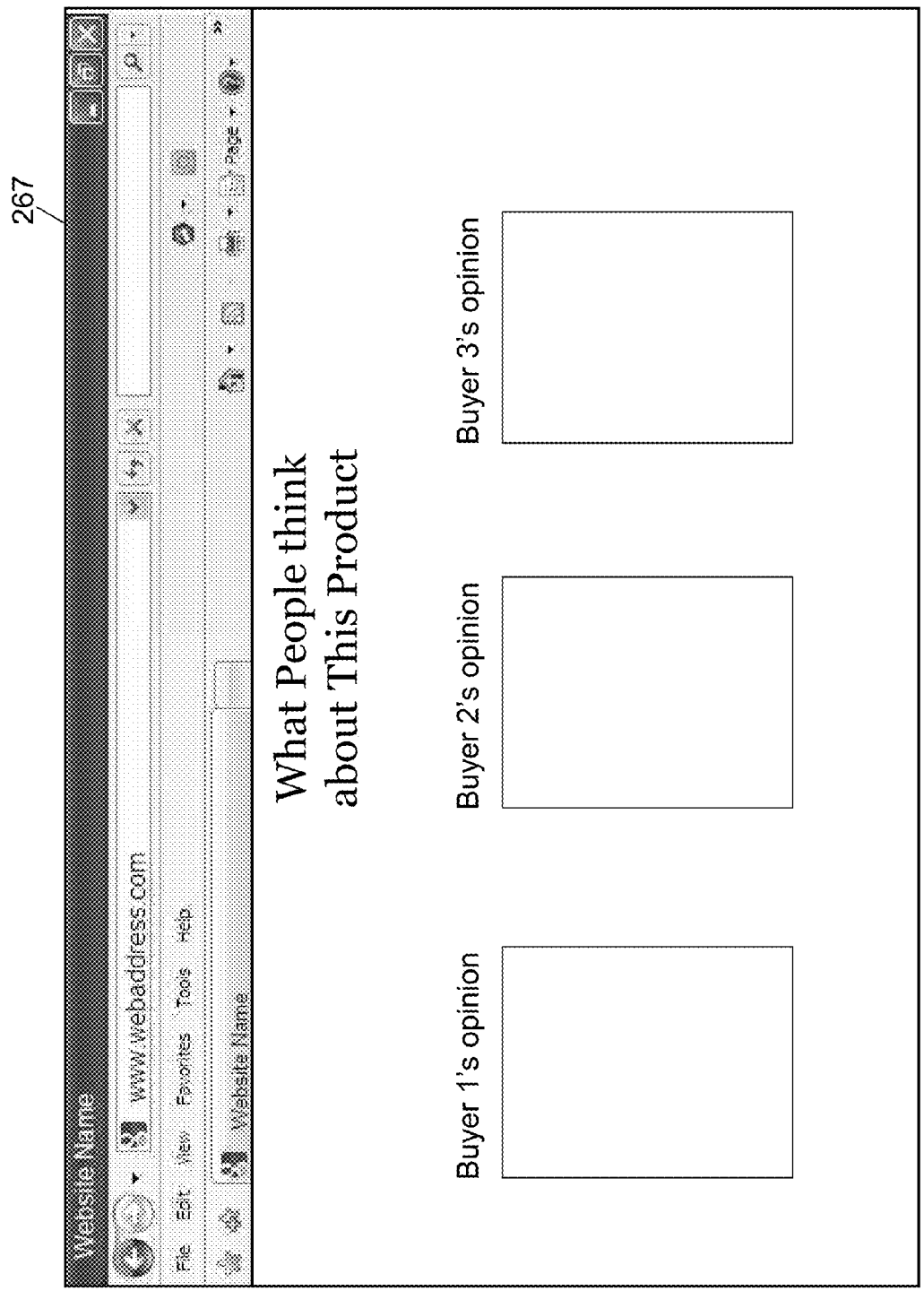
FIG. 7 illustrates a target webpage to which a user is directed based on the selection of the hyperlink in the target webpage illustrated in FIG. 6 in accordance with an example embodiment of the present invention.

As yet another example, the user may decide that, although the website 260 appears to be relevant to the user's inquiry, the user cannot find exactly the information he is seeking on the particular webpage 265 displayed. Thus, the user may perform a search that is limited to only that website 260 in an effort to find a more pertinent webpage of the website by using a search engine provided by the website itself. In this regard, the user may enter additional search data 300 into a search text box 310 provided by the website 260, as shown in FIG. 6, and may be presented with a list of results from the website (not shown) from which to choose.

As illustrated by the example scenario described above in connection with FIGS. 4-7, a user's quest for information on a certain topic may involve both search data and navigational data. In addition, the user's path may not necessarily be linear. In other words, the user may back track to a previous website or a previous list of search results or may initiate the search process all over again if the original search proves to be unfruitful.

In some cases, the user may not be able to find the desired information in a single searching session and may have to discontinue the search for a period of time, then resume the search later. In such cases, it may be helpful for the user to have not only a record of the webpages accessed (e.g., the navigational data) or search terms used in the previous search (e.g., the search data), but also a meaningful organization and contextual representation of this data. In other words, although the user may recall or otherwise have a record of one or more of the webpages he visited, the user may not necessarily remember how or why he found those webpages. The "how" and "why" (e.g., the context) of the search may help the user recreate his search to review previous results, build upon the previous searching session to find more information or information on a related topic, verify that the search was appropriate and/or sufficiently thorough, or pass the search along to another party interested in the same or a similar topic.

Thus, embodiments of the present invention provide for an apparatus 50 (depicted in FIG. 3) that comprises at least one processor 70 and at least one memory 76 including computer program code, the at least one memory and the computer program code configured to, with the processor, cause the apparatus to access search data (such as the keyword 210 shown in FIGS. 4 and 5) that is provided to a website and navigational data (such as the hyperlink 290 shown in FIG. 6) that relates to a webpage. A relationship between the search data and the navigational data may be determined, for example, by the processor 70. The apparatus may further provide for a graphical representation of the search data, the navigational data, and the relationship between the search and navigational data, for example, on a user interface 72 (such as the display 28 of FIG. 2).

In cases where the apparatus is configured to communicate with and retrieve content directly from the web host servers 130, 140 in FIG. 1, the search history and the web browsing history (e.g., the search data and the navigational data) may be monitored and stored at the location of the apparatus, such as in the memory 76 of FIG. 3. In other cases where the apparatus is not configured to communicate directly with the web host servers 130, 140 (e.g., when the user device accesses the Web via server-assisted browsing using, for example, the web browsing server 120), the search data and navigational data may be stored at the location of the web browsing server 120, such as through the use of plug-in software. For example, in some embodiments, search data and/or navigational data generated through searching and/or navigation across multiple websites (e.g., via multiple search engines) may be monitored through a software module that is plugged into the web browser. Thus, the search data and/or navigational data in this case can be stored either locally (at the location of the apparatus) or on a device (e.g., a server) in communication with the apparatus.

The search data and navigational data may be related in various ways, depending on the particular terms used, the webpages visited, and the circumstances under which the search was conducted by the user. As an example, in some cases the relationship may be a semantic relationship, whereas in other cases the relationship may be a navigational relationship. Furthermore, relationships may exist between two pieces of search data, between two pieces of navigational data, or between a piece of search data and a piece of navigational data.

In particular, the processor 70 may determine that one piece of search data is related to another piece of search data based on a semantic relationship. For example, when the search data includes keywords that are entered into a search engine or other web searching program, the processor may determine that a semantic relationship exists between two of the keywords. The semantic relationship may be determined based on a similarity in the meaning of the keywords. For example, the processor may determine that the word "Wedding" and the phrase "Bridal gown" that were used as search data are related by a semantic relationship due to the similarity in meanings between the terms. As another example, the processor may determine that navigational data (e.g., a web address) and search data (e.g., a keyword) are (or may be) related by a semantic relationship because the navigational data relates to a target webpage having metadata (e.g., a metatag) that is the same as or similar to the keyword. Thus, the processor may be configured to identify and/or propose a semantic relationship between certain data.

Figure 8:
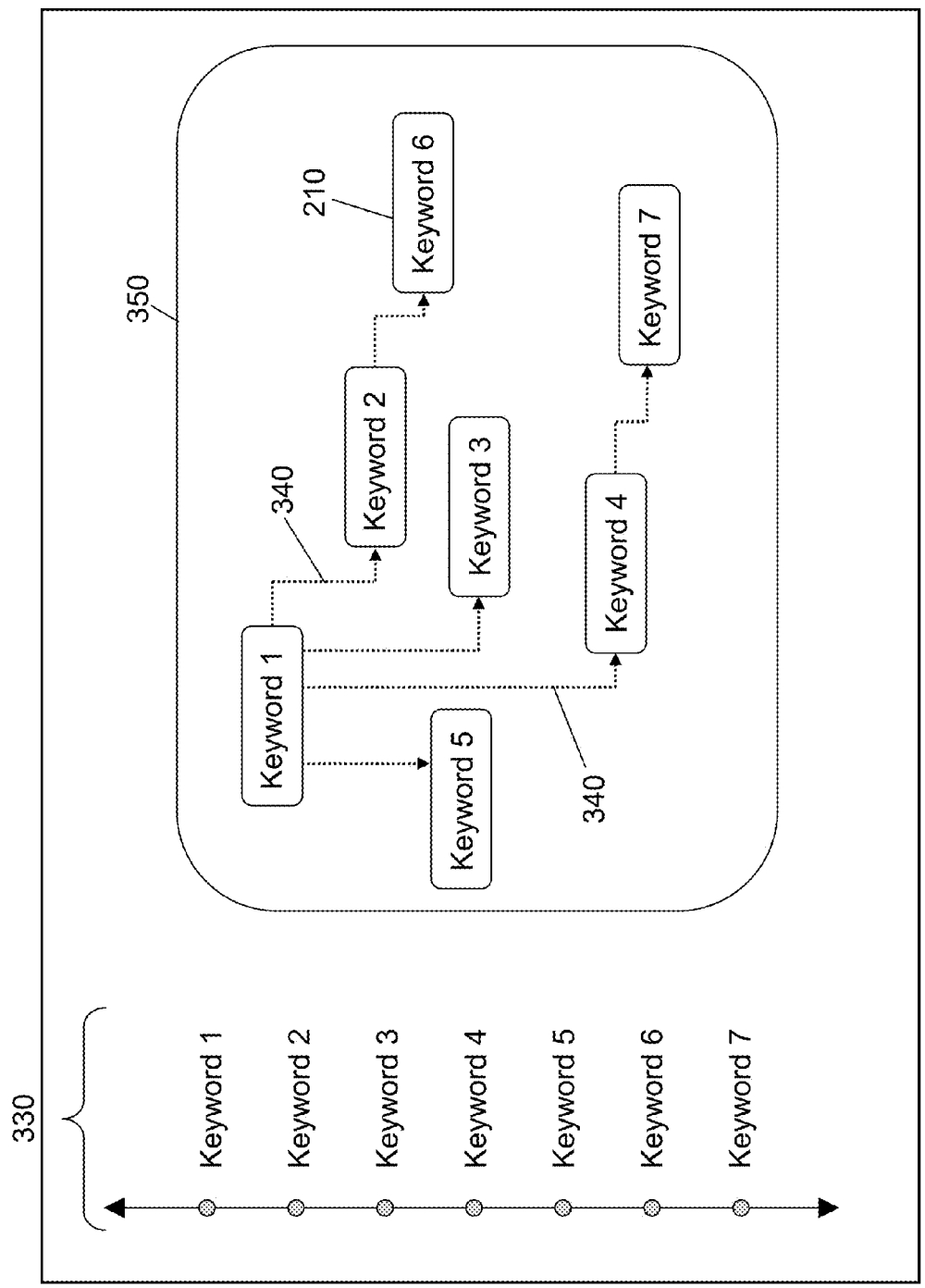
FIG. 8 illustrates search data in the form of keywords and the semantic relationships that may exist therebetween in accordance with an example embodiment of the present invention.

Turning to FIG. 8, for example, the user may have conducted some searching over a period of time using seven keywords that were entered into one or more search engines or other websites: Keyword 1, Keyword 2, Keyword 3, Keyword 4, Keyword 5, Keyword 6, and Keyword 7. Although the user's searching may have occurred chronologically as indicated along the timeline 330, semantic relationships 340 may exist between the search terms as indicated by the dotted-line arrows in the area 350. In other words, Keywords 2, 3, 4, and 5 may be related via a semantic relationship to Keyword 1; Keyword 6 may be related via a semantic relationship to Keyword 2; and Keyword 7 may be related via a semantic relationship to Keyword 4, as represented in the area 350.

Search and navigational data may, however, may be related to each other via a navigational relationship. For example, navigational data (e.g., a link) may be related to search data (e.g., a keyword) via a navigational relationship when the search results based on the search data include the link that is selected. In other words, the entry of a keyword (the search data) may bring up a list of results, and the user may select one of the results to bring up the webpage (the navigational data) corresponding to the selected hyperlink. As another example, a navigational relationship may exist between two pieces of navigational data when the webpage resulting from one piece of navigational data contains a hyperlink that is selected by the user (i.e., the second piece of navigational data). Alternatively, a navigational relationship may be determined when the user navigates from one webpage to another by typing in a web address for a particular webpage in the web browser, which takes the user to the target webpage.

In some embodiments, the search and/or navigational data may be related by both a semantic relationship and a navigational relationship. In other words, the semantic relationship and the navigational relationship may not be mutually exclusive. In such cases of multiple relationships, the apparatus may select a single relationship (e.g., a semantic or a navigational relationship) to be indicated, such as the relationship that may be the most useful to the user.

Figure 9:
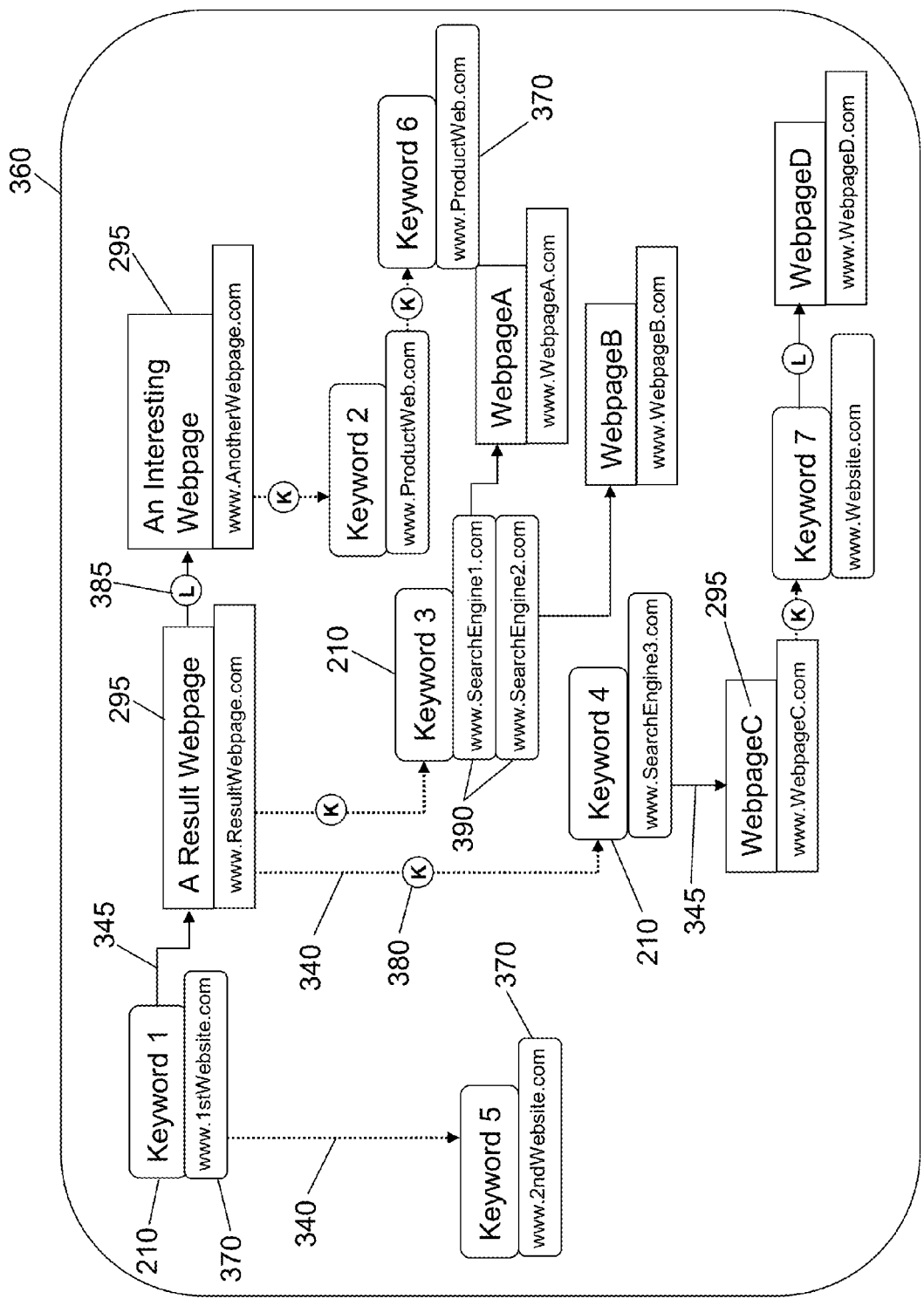
FIG. 9 illustrates a graphical representation of search data, navigational data, and the relationships therebetween in accordance with an example embodiment of the present invention.

Thus, in FIG. 9, a graphical representation 360 of the search data, the navigational data, and the relationship between the two may be caused to be provided (e.g., on the display of the apparatus). In other words, the graphical representation 360 of the illustrated embodiment shows how the search data (e.g., the keywords used in the search) are related and also shows the user's navigation from one webpage to the next. In addition, the graphical representation 360 provides an integrated view of how the search data and the navigational data (e.g., the search history and the web browser history) are related amongst themselves and with respect to each other.

In the graphical representation 360 shown in FIG. 9, for example, semantic relationships between items of search data and/or navigational data are indicated by dotted-line arrows 340, whereas navigational relationships between the items are indicated by solid-line arrows 345. In addition, search data 210 are graphically represented by rounded rectangles that may include an indication of the search data (e.g., the keyword used), whereas navigational data 295 may be represented by standard rectangles that may include an indication of the webpage that is the target of the link selected or the web address provided by the user.

Working from left to right in FIG. 9, a user's entry of Keyword 1 as search data 210 using search functionality provided by www.1stWebsite.com may pull up a list of relevant websites, from which the User may select a hyperlink for A Result Webpage (provided at web address www.ResultWebpage.com). In this scenario, the navigational data 295 corresponding to "A Result Webpage" is related to search data 210 corresponding to Keyword 1 based on a navigational relationship 345. At the same time, however, Keyword 5, which was entered using search functionality found on www.2ndWebsite.com, may be related to Keyword 1 by a semantic relationship 340.

Continuing with the example depicted in FIG. 9, the navigational data 295 corresponding to A Result Webpage may be related via a navigational relationship to An Interesting Webpage (having a web address of www.AnotherWebpage.com). An Interesting Webpage may in turn be related to the search data 210 of Keyword 2, and Keyword 2 may be related by a semantic relationship to Keyword 6, as shown. A Result Webpage may also be related, via a semantic relationship, to the search data 210 corresponding to Keyword 3 and Keyword 4. Keyword 3 may be related via a navigational relationship to each of WebpageA and WebpageB, whereas Keyword 4 may be related via a navigational relationship to WebpageC, which is related via a semantic relationship to Keyword 7, which is in turn related via a navigational relationship to WebpageD.

As shown in the depicted example of FIG. 9, the search data 210 may be entered into multiple different websites. In other words, the search data 210 may include search data (e.g., a first keyword) that is provided to a first website and search data (e.g., a second keyword) that is provided to a second website that is different from the first website. In this way, an apparatus configured in accordance with embodiments of the present invention may be able to determine a relationship between search data 210 (Keyword 1) provided to 1stWebsite and a search data (Keyword 5) provided to 2ndWebsite. Thus, the user has the freedom to use search functionality available through multiple websites while still having the search data captured across all the websites for subsequent access and analysis to determine the type of relationships that exists between the data for inclusion in the graphical representation 360.

Additionally, common search data associated with different websites may be identified and represented as a single instance having a represented association with the multiple websites that performed the searches. This representation of the multiple associations may allow the user to see (and recognize) these associations using less space than would be required if the search data were represented separately for each website.

As shown in FIG. 9, for example, the graphical representation may be organized such that the search terms used are principal in the hierarchy, as opposed to the websites on which the search was performed. Thus, a search using the same keyword, but performed on two different websites, may be commonly indicated by including the names of both searched websites 390 proximate the respective indication of the keyword. In this way, information that, in real time, relates to two different searches that were performed by the user may be represented to the user in a consolidated format that provides context to the searches and the webpages identified by the searches.

In some embodiments, the representation of the search data, the navigational data, and the relationships that exist between the data may vary. For example, the graphical representation 360 may include the web address 370 of the website on which the search data was used. In addition, the basis for determining the relationship (e.g., as determined by the processor 70 of FIG. 3) between the search and/or navigational data may also be included. A basis indicator 380 consisting of a "K" enclosed by a circle may, for example, be included on a representation of a semantic relationship 340 to indicate that the basis for determining that a semantic relationship exists is that the respective search data (e.g., Keyword 4) is a keyword that appears as text on the webpage (e.g., A Result Webpage). In other words, in this particular example, Keyword 4 has a semantic relationship with the navigational data 295 relating to the webpage A Result Webpage because the term "keyword 4" appears as text on A Result Webpage. Similarly, a basis indicator 385 consisting of an "L" enclosed by a circle may, for example, be included on a representation of a navigational relationship 345 to indicate that the basis for determining that a navigational relationship exists is that the webpage is the result (e.g., is a target) of a hyperlink found on another webpage. In other words, one piece of navigational data points to an originating webpage (e.g., the source of the hyperlink), whereas another piece of navigational data points to the target webpage (e.g., the destination of the hyperlink).

In some cases, the lack of a basis indicator 380, 385 may itself be an indicator of how the relationship was determined. For example, the representation of a semantic relationship 340 without any additional basis indicator may represent that the two respective pieces of data are related in meaning. Thus in FIG. 9, Keyword 1 and Keyword 5 may be semantically related based on the similarity in the two keywords, rather than one keyword appearing on the same webpage as the other, and the same may be indicated by the dotted-line arrow (not accompanied by any other marker). Likewise, the representation of a navigational relationship 345 without any additional basis indicator may represent that the webpage corresponding to one piece navigational data is the result of a search performed using the related search data (e.g., rather than the user's selection of a link on another webpage that is not a list of search results).

As described above, search data, navigational data, the relationships determined between them, and details regarding the search and navigational data may be provided in the graphical representation 360. The graphical representation 360 may include search data and navigational data used by a user and/or generated during a single search session or over multiple searching sessions. In other words, the apparatus may be configurable by the user to provide the graphical representation based on any searching that took place over a predetermined window of time, which may span multiple different search sessions. Thus, for example, the user may have conducted a single search at work regarding the negotiation of lease contract, whereas the user may have also conducted multiple searches at home in a search for the perfect wedding gown. In this case, the apparatus may be configured in some embodiments to provide for a graphical representation relating to all of the search data and navigational data generated by the user over a predetermined period of time, such as the past two weeks. In other embodiments, the apparatus may be configured to provide for a graphical representation 360 relating to a predetermined amount of search and/or navigational data (e.g., the 200 most recent keywords used and/or websites visited).

In some cases, the apparatus 50 of FIG. 3 includes memory and computer program code that are further configured to, with the processor, cause the apparatus to receive an input via the graphical representation (e.g., the graphical representation 360) selecting an item of represented search data or navigational data. For example, where the graphical representation of the search data includes the indication of a keyword and the graphical representation of the navigational data includes the indication of a webpage, selection of an indicated keyword may result in a new search being performed using the selected keyword, whereas selection of an indicated webpage may take the user to the indicated webpage (e.g., the target webpage corresponding to the indicated web address, hyperlink, or the represented web content).

For example, a user presented with the graphical representation 360 of FIG. 9 may wish to review the entire list of results corresponding to a search using the search data 210 of Keyword 1, such as to see if there is relevant information using hits other than the ones that were originally selected and that are represented on the graphical representation 360. In this case, the user may be able to select the search data 210 for Keyword 1 (e.g., by clicking on the rounded rectangle for Keyword 1 using a mouse), and the user's selection of Keyword 1 may cause a new search to be performed for Keyword 1 using search functionality provided by the indicated website (in this case, www.1stWebsite.com). Because a new search is performed, and because the content available on the Internet is always changing, the results of the new search may not be identical to the search results that the user obtained when the original search using Keyword 1 was conducted. Thus, in a sense, the graphical representation 360 may be a static representation of dynamic content in some cases. In other cases, however, the apparatus may be configured such that the results of the original search are stored, and selection of one of the pieces of search data may cause the access and display of the stored list of results.

Similarly, the user may wish to review content from one of the webpages corresponding to a represented item of navigational data 295. The user may select navigational data 295 (e.g., by clicking on the rectangle for An Interesting Webpage using a mouse), and as a result the corresponding webpage may be displayed to the user (e.g., the user may be directed to www.AnotherWebpage.com in this example).

FIG. 9 illustrates an example of a graphical representation of search data, navigational data, and the relationships therebetween. The search data, navigational data, and the relationships therebetween may be graphically represented in several other ways, and other information regarding the search data, navigational data, and the relationships may be provided instead of or in addition to the information shown and discussed above with respect to FIG. 9. For example, in some embodiments, navigational data may be represented by displaying webpage content in the form of a thumbnail of the webpage. In other cases, the navigational data may comprise the web address of the target webpage, a hyperlink, or some other representation of the navigational data.

Furthermore, the relationships between the search data and the navigational data in FIG. 9 are represented by arrows (e.g., dotted-line arrows for semantic relationships and solid-line arrows for navigational relationships). The relationships may, however, be indicated in other ways, according to the configuration of the apparatus and/or user preferences. For example, semantic relationships may be indicated using overlays (e.g., two keywords that are semantically related may be displayed in an overlapping manner). In addition, other types of relationships may also be determined instead of or in addition to semantic and navigational relationships. For example, data may be related based on the timing of the use of the data by the user (e.g., when the items of data were used or generated by the user with respect to each other).

Figure 10:
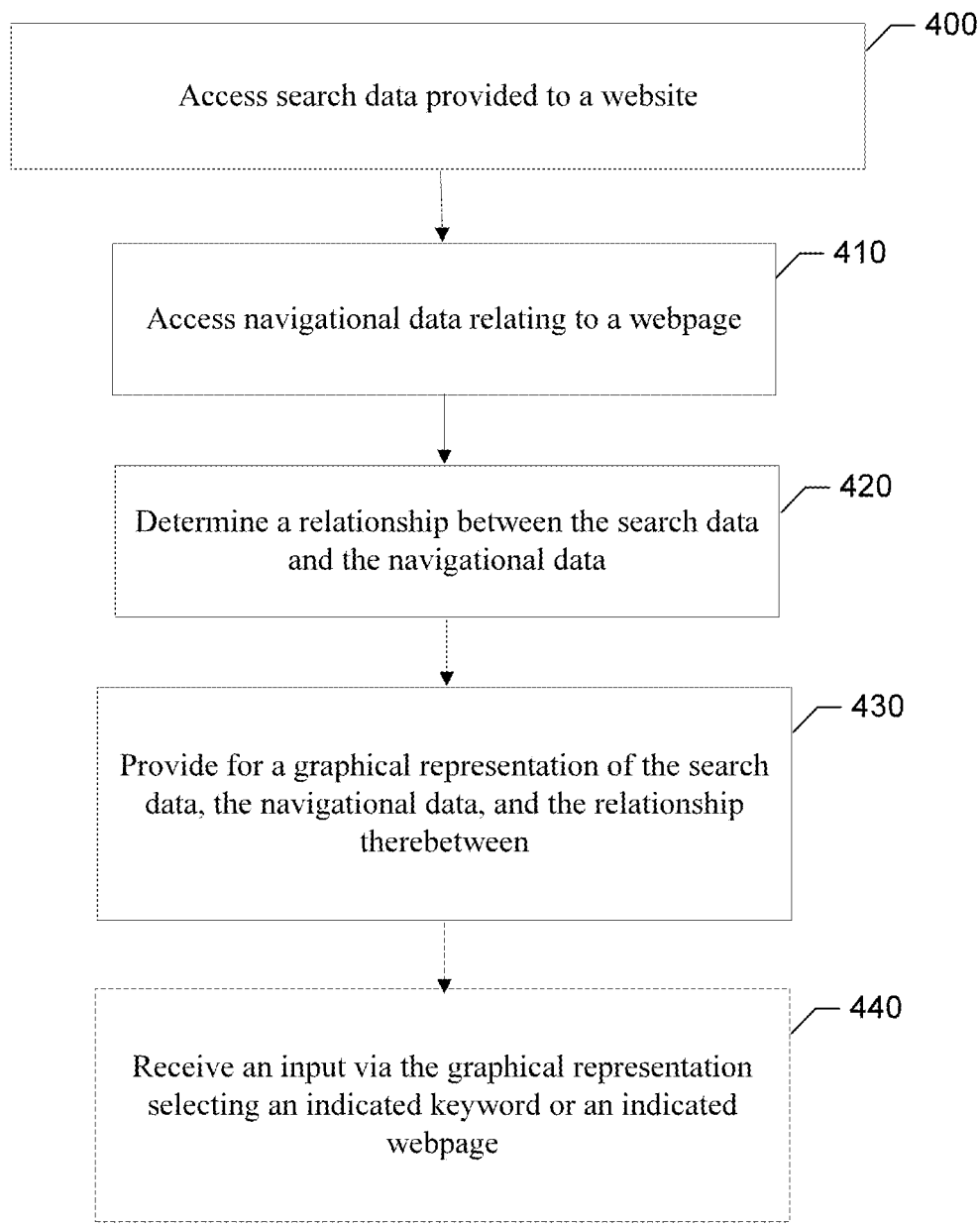
FIG. 10 illustrates a flowchart of a method of providing an integrated graphical representation of search and web browsing histories according to an example embodiment of the present invention.

Turning now to FIG. 10, FIG. 10 illustrates a flowchart of a system, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for relating search data and navigational data, as shown in FIG. 10, includes accessing search data provided to a website and accessing navigational data relating to a webpage at operations 400 and 410. The method further includes determining a relationship between the search data and the navigational data at operation 420 and providing for a graphical representation of the search data, the navigational data, and the relationship at operation 430.

As described above, the search data may comprise at least one keyword, and the website to which the search data is provided may be a web host server 130,140 and, in one embodiment, may comprise a search engine. In some cases, the search data may include search data that is provided to a first website and search data that is provided to a second website, where the first website is different from the second website. Moreover, the navigational data may include a web address or a hyperlink. In some cases, the relationship between the search data and the navigational data may be a semantic relationship, whereas in other cases the relationship may be a navigational relationship. In some cases, the graphical representation may include an indication of the website via which the search data was received.

Embodiments of the method may further comprise receiving an input via the graphical representation selecting one of the represented items of search data or navigational data at operation 440. The selection of search data (e.g., an indicated keyword) may result in a new search being performed, whereas the selection of navigational data (e.g., an indicated webpage) may take the user to a respective target webpage.

In some embodiments, certain ones of the operations above may be modified or further amplified as described herein. Furthermore, in some embodiments, additional optional operations may be included, some examples of which are shown in dashed lines in FIG. 10. Modifications, additions, or amplifications to the operations above may be performed in any order and in any combination. In addition, in some embodiments, one or more of operations 400-440 may be repeated for a plurality of pieces of search and/or navigational data.

In an example embodiment, an apparatus for performing the method of FIG. 10 above may comprise a processor (e.g., the processor 70 of FIG. 3) configured to perform some or each of the operations (400-440) described above. The processor may, for example, be configured to perform the operations (400-440) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 400,410, and 440 may comprise, for example, the processor 70, the memory device 76, the user interface 72, and/or a device or circuit for executing instructions or executing an algorithm for processing information as described above. Examples of means for performing operation 420 may comprise, for example, the processor 70 and/or a device or circuit for executing instructions or executing an algorithm for processing information as described above. Furthermore, examples of means for performing at least portions of operation 430 may comprise, for example, the processor 70, the user interface 72, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   access instances of search data provided to a website, wherein the search data comprises a keyword;
   access instances of navigational data relating to a webpage, wherein the navigational data comprises webpage information;
   determine relationships between the instances of search data, between the instances of search data and the instances of navigational data, and between the instances of navigational data;
   generate a user interface on a display of a user device associated with the apparatus, wherein the user interface comprises a graphical representation of the search data, the navigational data, relationships therebetween, and an indicator of how the relationships therebetween are determined, wherein the relationships comprise semantic relationships and navigational relationships;
   receive selection of a keyword indicated on the graphical representation from a user of the user device via the user's interaction with the user interface, wherein receipt of the selection of the keyword results in a new search being performed using the selected keyword; and
   receive selection of a webpage indicated on the graphical representation from the user of the user device via the user's interaction with the user interface, wherein receipt of the selection of the webpage results in navigation to the selected webpage.

2. The apparatus of claim 1, wherein the search data comprises search data provided to a first website and search data provided to a second website, wherein the first website is different from the second website.

3. The apparatus of claim 1, wherein the website comprises a search engine.

4. The apparatus of claim 1, wherein receiving selection of a webpage comprises receiving selection of at least one of a web address, a hyperlink, or webpage content.

5. The apparatus of claim 1, wherein the at least one memory and the computer program code are further configured to, with the processor, cause the apparatus to determine a basis for at least one of the relationships and to provide for a graphical representation of the basis.

6. A method comprising:
accessing instances of search data provided to a website, wherein the search data comprises a keyword;
accessing instances of navigational data relating to a webpage, wherein the navigational data comprises webpage information;
determining, via a processor, relationships between the instances of search data, between the instances of search data and the instances of navigational data, and between the instances of navigational data;
generating a user interface on a display of a user device associated with an apparatus, wherein the user interface comprises a graphical representation of the search data, the navigational data, relationships therebetween, and an indicator of how the relationships therebetween are determined, wherein the relationships comprise semantic relationships and navigational relationships;
receiving selection of a keyword indicated on the graphical representation from a user of the user device via the user's interaction with the user interface, wherein receipt of the selection of the keyword results in a new search being performed using the selected keyword; and
receiving selection of a webpage indicated on the graphical representation from the user of the user device via the user's interaction with the user interface, wherein receipt of the selection of the webpage results in navigation to the selected webpage.

7. The method of claim 6, wherein the search data comprises search data provided to a first website and search data provided to a second website, wherein the first website is different from the second website.

8. The method of claim 6, wherein receiving selection of a webpage comprises receiving selection of at least one of a web address, a hyperlink, or webpage content.

9. The method of claim 6 further comprising determining a basis for at least one of the relationships and providing for a graphical representation of the basis.

10. The method of claim 6, wherein the website comprises a search engine.

11. A computer program product comprising at least one non-transitory computer-readable storage medium having computer-executable program code portions stored therein, the computer-executable program code portions comprising program code instructions for:
accessing instances of search data provided to a website, wherein the search data comprises a keyword;
accessing instances of navigational data relating to a webpage, wherein the navigational data comprises webpage information;
determining relationships between the instances of search data, between the instances of search data and the instances of navigational data, and between the instances of navigational data;
generating a user interface on a display of a user device associated with an apparatus, wherein the user interface comprises a graphical representation of the search data, the navigational data, relationships therebetween, and an indicator of how the relationships therebetween are determined, wherein the relationships comprise semantic relationships and navigational relationships;
receiving selection of a keyword indicated on the graphical representation from a user of the user device via the user's interaction with the user interface, wherein receipt of the selection of the keyword results in a new search being performed using the selected keyword; and
receiving selection of a webpage indicated on the graphical representation from the user of the user device via the user's interaction with the user interface, wherein receipt of the selection of the webpage results in navigation to the selected webpage.

12. The computer program product of claim 11, wherein the search data comprises search data provided to a first website and search data provided to a second website, wherein the first website is different from the second website.

13. The computer program product of claim 11, wherein the website comprises a search engine.

14. The computer program product of claim 11, wherein receiving selection of a webpage comprises receiving selection of at least one of a web address, a hyperlink, or webpage content.

15. The computer program product of claim 11 further comprising determining a basis for at least one of the relationships and providing for a graphical representation of the basis.

\* \* \* \* \*